United States Patent
Zhang et al.

(10) Patent No.: US 11,861,810 B2
(45) Date of Patent: Jan. 2, 2024

(54) IMAGE DEHAZING METHOD, APPARATUS, AND DEVICE, AND COMPUTER STORAGE MEDIUM

(71) Applicant: TENCENT TECHNOLOGY (SHENZHEN) COMPANY LIMITED, Shenzhen (CN)

(72) Inventors: Jingyun Zhang, Shenzhen (CN); Runzeng Guo, Shenzhen (CN); Shaoming Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 146 days.

(21) Appl. No.: 17/577,857

(22) Filed: Jan. 18, 2022

(65) Prior Publication Data

US 2022/0138912 A1    May 5, 2022

Related U.S. Application Data

(63) Continuation of application No. PCT/CN2020/124026, filed on Oct. 27, 2020.

(30) Foreign Application Priority Data

Jan. 20, 2020    (CN) .......................... 202010065664.1

(51) Int. Cl.
*G06K 9/00* (2022.01)
*G06T 5/00* (2006.01)
(Continued)

(52) U.S. Cl.
CPC ................. *G06T 5/002* (2013.01); *G06T 5/50* (2013.01); *G06T 7/90* (2017.01);
(Continued)

(58) Field of Classification Search
CPC .......... G06T 2207/20208; G06T 5/003; G06T 5/009; G06T 5/50; G06T 2207/20221;
(Continued)

(56) References Cited

U.S. PATENT DOCUMENTS

2018/0338092 A1    11/2018    Fan et al.

FOREIGN PATENT DOCUMENTS

| CN | C103065282 A | 4/2013 |
|----|--------------|--------|
| CN | 107680054 A | 2/2018 |

(Continued)

OTHER PUBLICATIONS

Orniana, Single Image Dehazing by Multi-Scale Fusion, Aug. 2013, IEEE (Year: 2013).*

(Continued)

*Primary Examiner* — Alex Kok S Liew
(74) *Attorney, Agent, or Firm* — Crowell & Moring LLP

(57) ABSTRACT

This application provides an image dehazing method, apparatus, and device, and a computer storage medium. The method includes: in response to obtaining an image dehazing instruction, acquiring a first image and a second image corresponding to a target scene at the same moment. The method also includes calculating, based on a first pixel value of each pixel of the first image and a second pixel value of each pixel of the second image, haze density information of the each pixel; generating an image fusion factor of the each pixel according to the haze density information, the image fusion factor indicating a fusion degree between the first image and the second image; and fusing the first image and the second image according to the image fusion factor to obtain a dehazed image.

17 Claims, 9 Drawing Sheets

(51) Int. Cl.
*G06T 7/90* (2017.01)
*G06T 5/50* (2006.01)

(52) U.S. Cl.
CPC .............. *G06T 2207/10024* (2013.01); *G06T 2207/10048* (2013.01); *G06T 2207/20221* (2013.01); *G06T 2207/30168* (2013.01)

(58) Field of Classification Search
CPC .......... G06T 2207/10024; G06T 5/002; G06T 2207/10016; G06T 2207/10144; G06T 5/00; G06T 5/008; G06T 5/20; G06T 5/40; G06T 2207/20084; G06T 2200/21; G06T 2207/20012; G06T 2207/20092; G06T 2207/20104; G06T 2207/20172; G06T 2207/20192; G06T 2207/30232; G06T 2207/30252; G06T 7/13; G06T 3/40
See application file for complete search history.

(56) References Cited

FOREIGN PATENT DOCUMENTS

| | | | |
|---|---|---|---|
| CN | 107895357 | A | 4/2018 |
| CN | 108109129 | A | 6/2018 |
| CN | 108921803 | A | 11/2018 |
| CN | 109308691 | A | 2/2019 |
| CN | 109934781 | A | 6/2019 |
| CN | 110163804 | A | 8/2019 |
| CN | 111275645 | A | 6/2020 |
| EP | 3440627 | A1 | 2/2019 |
| WO | WO2017175231 | A1 | 10/2017 |

OTHER PUBLICATIONS

Zhi Wang, D. Watabe and Jianting Cao, "Improving visibility of a fast dehazing method," 2016 World Automation Congress (WAC), Rio Grande, 2016, pp. 1-6 (Year: 2016).*
L. Schaul, C. Fredembach and S. Süsstrunk, "Color image dehazing using the near-infrared," 2009 16th IEEE International Conference on Image Processing (ICIP), Cairo, Egypt, 2009, pp. 1629-1632 (Year: 2009).*
International Search Report with English translation and Written Opinion regarding PCT/CN2020/124026 dated Jan. 27, 2021.
Chinese Office Action with English concise explanation of relevance regarding 202010065664.1 dated Jun. 20, 2023, 11 pages.
Peng Cheng et al., "An algorithm of image dehazing using near-infrared," Journal of Sichuan University (Engineering Science Edition) vol. 45, Supp. 2, Jul. 1, 20180.
Songchen Han et al., "An improved dehazing algorithm based on near infrared image," Advanced Engineering Sciences, vol. 50, No. 2, Mar. 21, 2018.
Jingyun Zhang et al., Realtime defog model based on visible and near-infrared information, ICMEW, Sep. 30, 2016.

\* cited by examiner

IMAGE DEHAZING METHOD, APPARATUS, AND DEVICE, AND COMPUTER STORAGE MEDIUM

RELATED APPLICATION

This application is a continuation application of PCT Patent Application No. PCT/CN2020/124026, filed on Oct. 27, 2020, which claims priority to Chinese Patent Application No. 202010065664.1 filed on Jan. 20, 2020, both of which are incorporated herein by reference in their entireties.

FIELD OF THE TECHNOLOGY

This application relates to the field of image processing technologies in artificial intelligence (AI) technologies, and in particular, to an image dehazing method, apparatus, and device, and a computer storage medium based on AI.

BACKGROUND OF THE DISCLOSURE

At present, an image acquisition device plays an important role in people's lives. For example, an image pickup device is used to shoot a monitor area, to ensure security of the monitor area, and a camera is used to acquire an image of a human face, to perform identity verification based on the human face. However, in haze weather, serious noise exists in an image acquired using an image acquisition device such as an image pickup device or a camera, which affects subsequent image processing.

Image dehazing is an important direction in AI technologies and means that image processing technologies are used to remove noise in an image brought by haze and recover a hazeless and clear image. In the related art, common image dehazing technologies are mostly to process a color image. However, the impact of haze on red light, blue light, or green light is different, and therefore information is missing in a dehazed image, leading to low quality of the dehazed image.

The present disclosure describes various embodiments for performing a dehazing process in an image, addressing at least one of issues/problems associated with haze images and improving the quality of the haze image, improving means in AI technologies and image processing technologies.

SUMMARY

Embodiments of this application provide an image dehazing method, apparatus, and device, and a computer storage medium, which can improve quality of a dehazed image.

The present disclosure describes a method for performing a dehazing process in an image. The method includes acquiring, by a device, a first image and a second image corresponding to a target scene. The device includes a memory storing instructions and a processor in communication with the memory. The method also includes calculating, by the device based on a first pixel value of each pixel of the first image and a second pixel value of each pixel of the second image, haze density information of the each pixel; generating, by the device, an image fusion factor of the each pixel according to the haze density information, the image fusion factor indicating a fusion degree between the first image and the second image; and fusing, by the device, the first image and the second image according to the image fusion factor to obtain a dehazed image.

The present disclosure describes an apparatus for performing a dehazing process in an image. The apparatus includes a memory storing instructions; and a processor in communication with the memory. When the processor executes the instructions, the processor is configured to cause the apparatus to perform: acquiring a first image and a second image corresponding to a target scene; calculating, based on a first pixel value of each pixel of the first image and a second pixel value of each pixel of the second image, haze density information of the each pixel; generating an image fusion factor of the each pixel according to the haze density information, the image fusion factor indicating a fusion degree between the first image and the second image; and fusing the first image and the second image according to the image fusion factor to obtain a dehazed image.

The present disclosure describes a non-transitory computer-readable storage medium, storing computer-readable instructions. The computer-readable instructions, when executed by a processor, are configured to cause the processor to perform: acquiring a first image and a second image corresponding to a target scene; calculating, based on a first pixel value of each pixel of the first image and a second pixel value of each pixel of the second image, haze density information of the each pixel; generating an image fusion factor of the each pixel according to the haze density information, the image fusion factor indicating a fusion degree between the first image and the second image; and fusing the first image and the second image according to the image fusion factor to obtain a dehazed image.

An embodiment of this application provides an image dehazing method, including:
  acquiring, when an image dehazing instruction is obtained, a color image and an infrared image corresponding to a target scene at the same moment in response to the image dehazing instruction, where the image dehazing instruction is triggered when haze exists in the target scene;
  calculating, based on a pixel value of each pixel point of the color image and a pixel value of each pixel point of the infrared image, haze density information of the each pixel point, where the haze density information describes distribution of haze density in the target scene;
  generating an image fusion factor of the each pixel point according to the haze density information, where the image fusion factor is used for controlling a fusion degree of the color image and the infrared image; and
  fusing the color image and the infrared image according to the image fusion factor, to obtain a dehazed image.

An embodiment of this application provides an image dehazing apparatus, including:
  an image acquisition part, configured to acquire, when an image dehazing instruction is obtained, a color image and an infrared image corresponding to a target scene at the same moment in response to the image dehazing instruction, where the image dehazing instruction is triggered when haze exists in the target scene;
  a haze density determining part, configured to calculate, based on a pixel value of each pixel point of the color image and a pixel value of each pixel point of the infrared image, haze density information of the each pixel point, where the haze density information describes distribution of haze density in the target scene;
  a factor generating part, configured to generate an image fusion factor of the each pixel point according to the haze density information, where the image fusion factor is used for controlling a fusion degree of the color image and the infrared image; and an image fusion part, configured to fuse the color image and the infrared image according to the image fusion factor, to obtain a dehazed image.

An embodiment of this application provides an image dehazing device, including:

a memory, configured to store an executable image dehazing instruction; and a processor, configured to implement the image dehazing method provided in the embodiments of this application when the executable image dehazing instruction stored in the memory is executed.

An embodiment of this application provides a computer storage medium storing an executable image dehazing instruction, configured to implement the image dehazing method provided in the embodiments of this application when a processor is caused to execute the executable image dehazing instruction.

DESCRIPTION OF EMBODIMENTS

Figure 1:
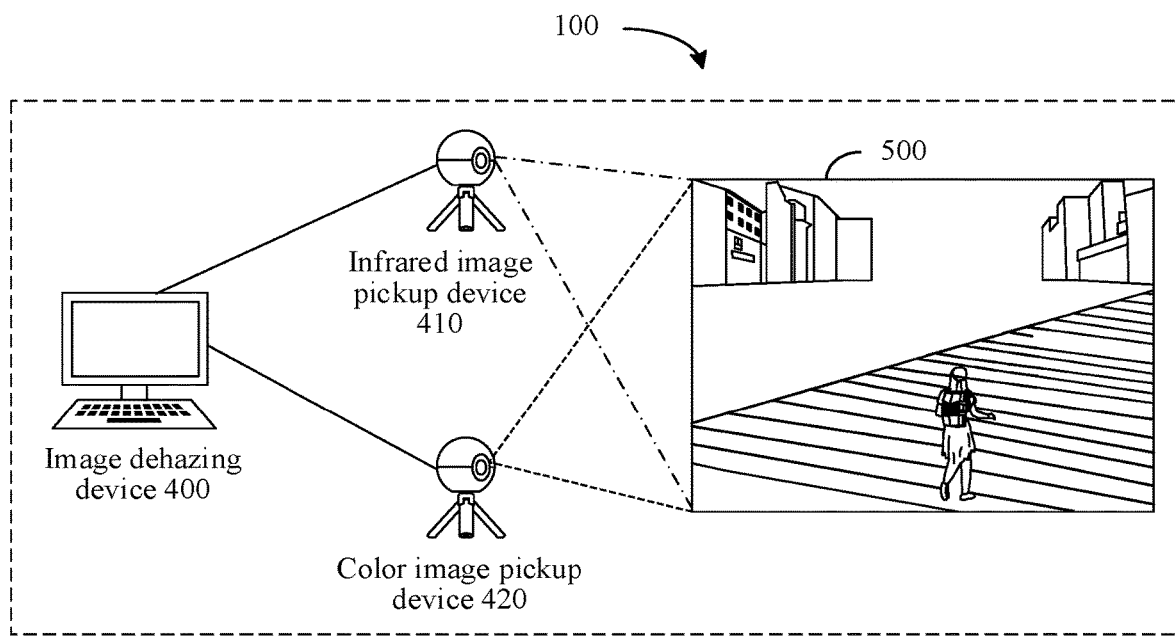
FIG. 1 is a schematic structural diagram of an image dehazing system 100 according to an embodiment of this application.

To make objectives, technical solutions, and advantages of this application clearer, the following further describes this application in detail with reference to the accompanying drawings, and described embodiments are not limitations on this application. All other embodiments obtained by a person of ordinary skill in the art without creative efforts shall fall within the protection scope of this application.

The following descriptions involve "some embodiments" which describes a subset of all possible embodiments. "Some embodiments" may be the same subset of all possible embodiments or may be different subsets of all possible embodiments, and may mutually combine in a non-conflict case.

In the following descriptions, the terms "first", "second" are merely intended to distinguish similar objects, but do not necessarily indicate a specific order. "First" and "second" may interchange a specific order or sequence in a permitted case, so that the embodiments of this application described herein can be implemented in a sequence in addition to the sequence shown or described herein.

Unless otherwise defined, all technical and scientific terms used herein have the same meaning as commonly understood by a person skilled in the art to which this application belongs. Terms used in the specification of this application are merely intended to describe objectives of the specific embodiments, but are not intended to limit this application.

Before the embodiments of this application are further described in detail, a description is made on nouns and terms involved in the embodiments of this application, and the following explanations are applicable to the nouns and terms involved in the embodiments of this application.

1) AI is a theory, method, technology, and application system that uses a computer or a machine controlled by a computer to simulate, extend, and expand human intelligence, acquire knowledge, and use the knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines, so that the machines have the capabilities of perception, reasoning, and decision-making.

The AI technology is a comprehensive discipline, covering a wide range of fields including both hardware-level technologies and software-level technologies. The basic AI technology generally includes technologies such as sensors, dedicated AI chips, cloud computing, distributed storage, big data processing technologies, operating/interaction systems, and mechatronics. AI software technologies mainly include a computer vision (CV) technology, a speech processing technology, a natural language processing technology, machine learning/deep learning, and the like.

2) CV technology is a science that studies how to enable a machine to "see", that is, to implement machine vision such as recognition, tracking, and measurement for a target by using a camera and a computer in replacement of human eyes, and further perform graphic processing, so that the computer processes the target into an image more suitable for human eyes to observe, or more suitable to be transmitted to an instrument for detection. As a scientific subject, CV studies related theories and technologies, and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

3) Image dehazing is used because when an image acquisition device is being operated, it is inevitable to encounter haze weather, causing an image acquired by the image acquisition device to present a "gray" state (or "cloudy" state, or "foggy" state) and have low quality, and affecting a subsequent process such as an image-based biometric feature recognition technology. Image dehazing belongs to the field of the CV technology, that is, the CV technology is used to remove a haze effect in an image, to improve quality of the image.

4) Haze density information is a parameter that is used for representing haze density in an image and that is generated using haze penetration of light with different wavelengths. For example, infrared light has a wavelength greater than that of visible light and may penetrate haze to form an image, while light with a shorter wavelength, such as blue light, has a penetration degree varying with haze density. Therefore, imaging of infrared light and visible light may be used to obtain haze density information in the image.

5) Image dehazing instruction is an instruction used for triggering an image dehazing function when it is determined that haze exists. In an actual situation, haze does not exist all the time, and therefore, an instruction needs to be set, and dehazing is performed when it is determined that haze exists.

6) Cloud technology refers to unifying a series of resources such as hardware, software, or networks in a wide area network or a local area network, to achieve hosting technologies of computing, storing, processing, and sharing of data. The cloud technology is a general term of a network technology, an information technology, an integration technology, a management platform technology, and an application technology that are applied based on a cloud computing business model, which may form a resource pool to be used as needed, which is flexible and convenient. A cloud computing technology is becoming an important support.

In various embodiments of the present disclosure, a "haze" may refer to a "foggy" state, wherein particles in the atmosphere may include mostly liquid droplets. In some various embodiments of the present disclosure, a "haze" may refer to a "smoky" state, wherein particles in the atmosphere may include mostly solid particles. In some various embodiments of the present disclosure, a "haze" may refer to a "smoggy" state, wherein particles in the atmosphere may include liquid droplets and/or solid particles.

Embodiments of this application provide an image dehazing method, apparatus, and device, and a computer storage medium, which can improve quality of a dehazed image. Exemplary applications of the image dehazing device provided in the embodiments of this application are described below. The image dehazing device provided in the embodiments of this application may be implemented as a terminal of various types, or may be implemented as a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in this application.

The image dehazing device may be implemented as two devices, for example, the terminal and the server for performing the image dehazing method are both used as the image dehazing device. In this case, the terminal and the server may respectively implement some functions of the image dehazing method, for example, the terminal acquires a color image and an infrared image corresponding to a target scene and transmits the color image and the infrared image to the server, and the server further processes the color image and the infrared image, to generate a dehazed image. The image dehazing device may alternatively be implemented as an independent device, for example, the terminal is used as the image dehazing device, to acquire a color image and an infrared image using the terminal, and the terminal further processes the color image and the infrared image, to obtain a dehazed image.

The following describes an exemplary application of the image dehazing device. In the exemplary application, the image dehazing device is implemented as an independent device.

FIG. 1 is a schematic structural diagram of an image dehazing system 100 according to an embodiment of this application, to support of an image dehazing application based on AI. An infrared image pickup device (or an infrared camera, 410) and a color image pickup device (or a color camera 420) are disposed on the image dehazing device 400, to respectively obtain a color image and an infrared image of a target scene 500. In some implementations, the infrared camera and/or the color camera may be either a still-image camera or a video camera.

In some implementations, the infrared image pickup device and the color image pickup device may be integrated within a single camera that is capable of taking either an infrared image or a color image. For the sake of simplifying description, an infrared image pickup device (or an infrared camera) and a color image pickup device (or a color camera) may be referred in various embodiments.

The color image and the infrared image of the target scene 500 may be captured at a same moment or at a substantially same time. Here in the present disclosure, a substantially same time may refer to within a time duration shorter than 1 second.

In some other implementations, the infrared camera and the color camera may be very close to each other (e.g, within six inches), so that they may obtain substantial same view for the color image and the infrared image of the target scene 500 from substantially same position with substantial same angle (or substantial same perspective).

When the image dehazing device 400 obtains an image dehazing instruction, the image dehazing device 400 acquires the color image corresponding to the target scene 500 using the color image pickup device 420 and acquires the infrared image corresponding to the target scene 500 using the infrared image pickup device 410 at the same moment in response to the obtained image dehazing instruction, where the image dehazing instruction is triggered when haze exists in the target scene 500. The image dehazing device 400 calculates, based on a pixel value of each pixel point of the color image and a pixel value of each pixel point of the infrared image, haze density information of the each pixel point, to describe distribution of haze density in the target scene 500 using the haze density information of the each pixel point. Next, the image dehazing device 400 generates an image fusion factor of the each pixel point according to the haze density information, to control a fusion degree of the color image and the infrared image at the each pixel point. Finally, the image dehazing device 400 fuses the color image and the infrared image pixel by pixel according to the image fusion factor, to obtain a dehazed image. In this way, the image dehazing device 400 completes the entire image dehazing process.

Figure 2:
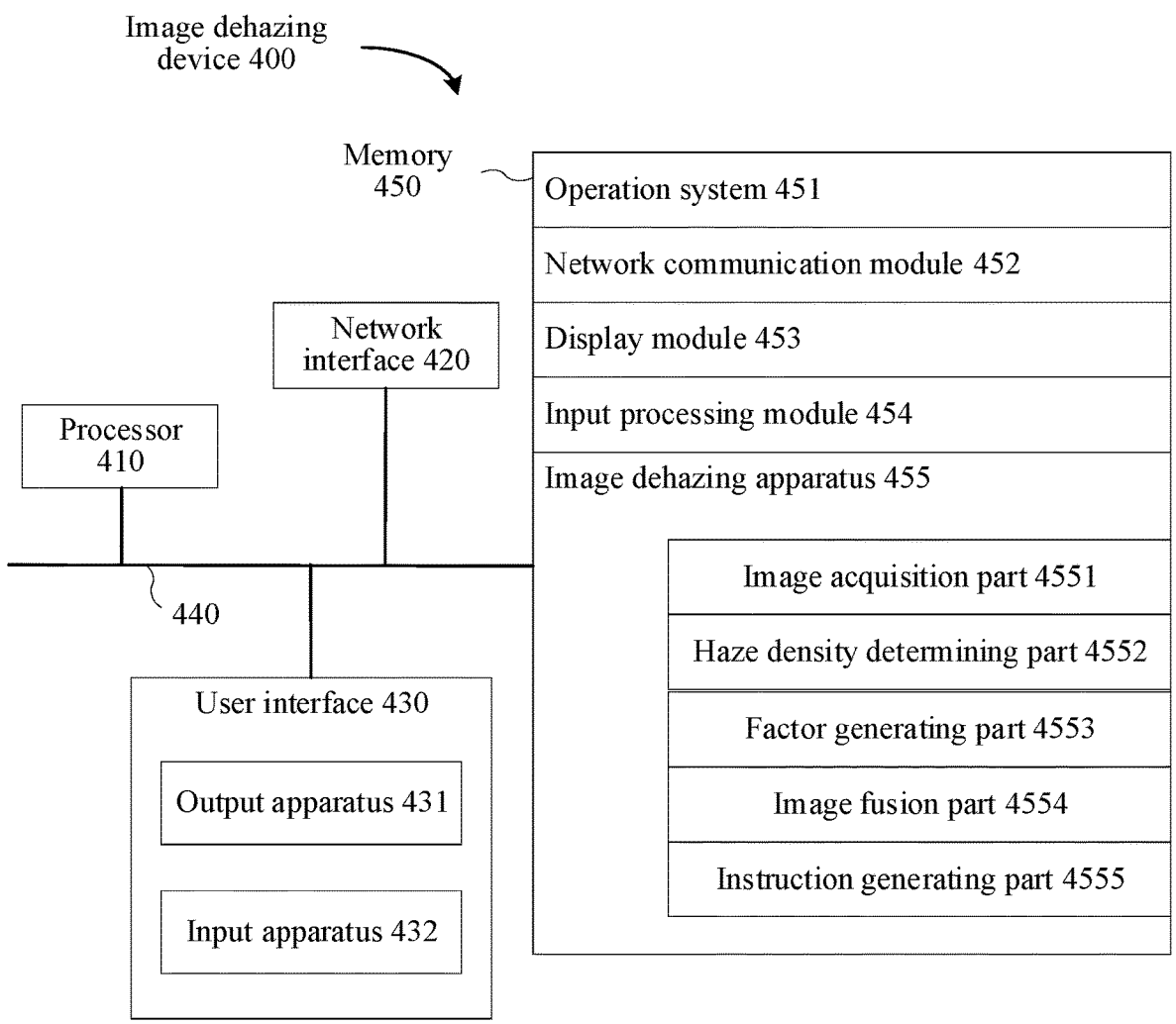
FIG. 2 is a schematic structural diagram of an image dehazing device 400 shown in FIG. 1 according to an embodiment of this application.

FIG. 2 is a schematic structural diagram of the image dehazing device 400 shown in FIG. 1 according to an embodiment of this application. The image dehazing device 400 shown in FIG. 2 includes: at least one processor 410, a memory 450, at least one network interface 420, and a user interface 430. All components in the image dehazing device 400 are coupled together through a bus system 440. The bus system 440 is configured to implement connection and communication among these components. In addition to a data bus, the bus system 440 further includes a power supply bus, a control bus, and a state signal bus. However, for clarity of description, all the buses are marked as the bus system 440 in FIG. 2.

The processor 410 may be an integrated circuit chip and has a signal processing capability, such as a general-purpose processor, a digital signal processor (DSP), or another programmable logic device, discrete gate, transistor logic device, or discrete hardware component. The general-purpose processor may be a microprocessor or any conventional processor.

The user interface 430 includes one or more output apparatuses 431 that can present media content, including one or more speakers and/or one or more visual display screens. The user interface 430 further includes one or more input apparatuses 432, including a user interface component helpful for a user input, such as a keyboard, a mouse, a touch display screen, a camera, or another input button or control component.

The memory 450 includes a volatile memory or a non-volatile memory, or may include a volatile memory and a non-volatile memory. The non-volatile memory may be a read-only memory (ROM), and the volatile memory may be a random access memory (RAM). The memory 450 described in the embodiments of this application aims to including any memory of an appropriate type. The memory 450 optionally includes one or more storage devices away from the processor 410 at the physical position.

In some embodiments, the memory 450 may store data to support various operations, an example of the data includes a program, a module, a data structure, or a subset or a super set thereof, and an exemplary description is provided below.

An operation system 451 includes system programs configured to process various basic system services and perform hardware-related tasks, such as a framework layer, a core library layer, and a driver layer, to implement various basic services and process hardware-based tasks.

A network communication module 452 is configured to reach other computing devices through one or more (wired or wireless) network interfaces 420, and an exemplary network interface 420 includes: Bluetooth, wireless fidelity (Wi-Fi), a universal serial bus (USB), or the like.

A display module 453 is configured to present information through the one or more output apparatuses 431 (such as a display screen and a speaker) related to the user interface 430 (such as a user interface used for operating peripheral equipment and displaying content and information).

An input process module 454 is configured to detect one or more inputs or interactions of one or more users from one of the one or more input apparatuses 432, and translate the detected inputs or interactions.

In some embodiments, the image dehazing apparatus provided in the embodiments of this application may be implemented in a software manner. FIG. 2 shows an image dehazing apparatus 455 stored in the memory 450, and the image dehazing apparatus may be software in a form of a program or a plug-in, including the following software modules: an image acquisition part 4551, a haze density determining part 4552, a factor generating part 4553, an image fusion part 4554, and an instruction generating part 4555, and functions of the modules are described below.

In some other embodiments, the image dehazing apparatus provided in the embodiments of this application may be implemented in a hardware manner. As an example, the image dehazing apparatus provided in the embodiments of this application may be a processor in a form of a hardware decoding processor, which is programmed to perform the image dehazing method based on AI provided in the embodiments of this application. For example, the processor in the form of the hardware decoding processor may adopt one or more application specific integrated circuits (ASICs), a DSP, a programmable logic device (PLD), a complex programmable logic device (CPLD), a field-programmable gate array (FPGA), or another electronic element.

Exemplarily, the embodiments of this application provide an image dehazing device, including:
 a memory, configured to store an executable image dehazing instruction; and
 a processor, configured to implement the image dehazing method provided in the embodiments of this application when the executable image dehazing instruction stored in the memory is executed.

The image dehazing method provided in the embodiments of this application is described below with reference to an exemplary application and implementation of the image dehazing device provided in the embodiments of this application. This application may be implemented by means of a cloud technology.

Figure 3:
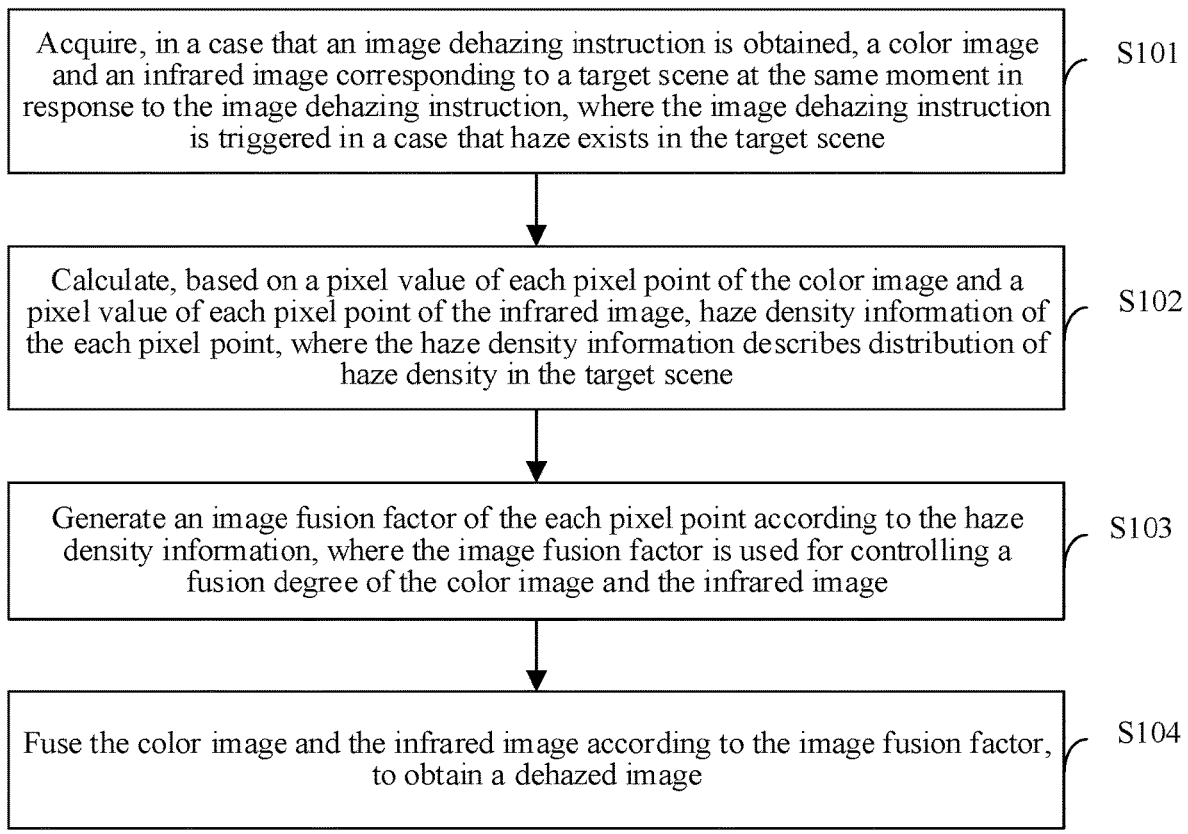
FIG. 3 is a schematic flowchart 1 of an image dehazing method according to an embodiment of this application.

FIG. 3 is a schematic flowchart 1 of an image dehazing method according to an embodiment of this application, and descriptions are provided with reference to steps shown in FIG. 3.

S101. Acquire, when an image dehazing instruction is obtained, a color image and an infrared image corresponding to a target scene at the same moment in response to the image dehazing instruction, where the image dehazing instruction is triggered when haze exists in the target scene. In some implementations, S101 may include acquiring, by a device comprising a memory storing instructions and a processor in communication with the memory, a first image and a second image corresponding to a target scene. In various embodiments in the present disclosure, a first image may be referred as a color image and a color image may be referred as a first image; and/or a second image may be referred as an infrared image and an infrared image may be referred as a second image; and/or the first image and the second image may be acquired at a same moment or at a substantially same moment.

The embodiments of this application are implemented in a scenario where a haze effect in an image is removed. During running, the image dehazing device monitors obtaining of the image dehazing instruction. When the image dehazing device obtains the image dehazing instruction, the image dehazing instruction specifies that image dehazing needs to be started, and the image dehazing device acquires the color image and the infrared image of the target scene respectively using a color image pickup device and an infrared image pickup device at the same moment in response to the image dehazing instruction, to make pixel points of the color image correspond strictly to those of the infrared image.

In the embodiments of this application, the image dehazing instruction is triggered when the image dehazing device determines that haze exists at a current moment, that is, the image dehazing device starts image dehazing only when haze exists in the target scene, and does not start the image dehazing process when no haze exists in the target scene, so that the dehazing function of the image dehazing device has an adaptive capability to different scenes.

In some embodiments of this application, the image dehazing device may determine that haze exists in the target scene according to weather warning. For example, the image dehazing device may pull weather information at the current time in the target scene from a network, and when the pulled weather information indicates that haze exists at the current time in the target scene, the image dehazing instruction is triggered, so that the image dehazing device starts the image dehazing. In some other embodiments of this application, the image dehazing device may alternatively first acquire several temporary images of a target scene, and then determine whether haze exists in these temporary images, and the image dehazing instruction is triggered when haze exists, so that the image dehazing device starts the image dehazing. Certainly, the image dehazing device may alternatively trigger the image dehazing instruction in other manners that can achieve the same objective. This is not limited in the embodiments of this application.

It may be understood that, the target scene may be any scene in an actual application, for example, a scene including a user face, so that the image dehazing device may use a dehazed and clear face image to verify a user identity, for another example, a scene including a specific building or a specific site, so that the image dehazing device may use a dehazed and clear image to perform security monitoring on the scene. Certainly, the target scene may alternatively be another scene, for example, each crossroad of a city or a hazy scenic spot. This is not limited in the embodiments of this application.

In the embodiments of this application, to facilitate obtaining a dehazed image using the color image and the infrared image, resolution of the color image needs to be the same as resolution of the infrared image. In this case, resolution of the infrared image pickup device may be the same as resolution of the color image pickup device, that is, the infrared image pickup device and the color image pickup device are directly used to acquire the color image and the infrared image of the same resolution. The resolution of the infrared image pickup device may be different from the resolution of the color image pickup device, that is, the color image and the infrared image of the same resolution are obtained in an image scaling manner. Certainly, the image dehazing device may alternatively obtain the color image and the infrared image of the same resolution in other manners. This is not limited in the embodiments of this application.

S102. Calculate, based on a pixel value of each pixel point of the color image and a pixel value of each pixel point of the infrared image, haze density information of the each pixel point, where the haze density information describes distribution of haze density in the target scene. In some implementations, S102 may include calculating, by the device based on a first pixel value of each pixel of the first image and a second pixel value of each pixel of the second image, haze density information of the each pixel.

After obtaining the color image and the infrared image, the image dehazing device first extracts the pixel value of the each pixel point of the color image and extracts the pixel value of the each pixel point of the infrared image, and then calculates the haze density information of the each pixel point according to a color pixel value and an infrared pixel value of the each pixel point. In this way, the image dehazing device can learn the distribution of haze in the target scene.

In the embodiments of this application, the image dehazing device may calculate the haze density information according to a difference between infrared light and visible light in haze penetration. When the haze density is smaller or even no haze exists, haze penetration degrees of both the infrared light and the visible light are higher. However, when the haze density is larger, the haze penetration degree of the infrared light is higher, and therefore brightness of the infrared image captured by the infrared image pickup device is higher, and the haze penetration degree of the visible light, especially blue light with a shorter wavelength, is lower, and therefore brightness of an image obtained by the color image pickup device in a blue-light channel is certainly lower. The pixel value of the infrared image includes brightness information of an infrared channel, and the pixel value of the color image includes pixel information of the blue-light channel. Based on this, the image dehazing device may analyze the haze density information of the each pixel point when the image dehazing device only obtains the pixel value of the each pixel point of the color image and the pixel value of the each pixel point of the infrared image. Based on this, in some embodiments of this application, the image dehazing device may obtain the brightness information of the blue-light channel of the each pixel point from the pixel value of the each pixel point of the color image, obtain the brightness information of the infrared channel of the each pixel point from the pixel value of the each pixel point of the infrared image, and then obtain the distribution of the haze density of the each pixel point based on the brightness information of the blue-light channel and the brightness information of the infrared channel.

In some other embodiments, the image dehazing device may alternatively input the color image and the infrared image into a trained haze density prediction model, extract features of the pixel value of the each pixel point of the color image and the pixel value of the each pixel point of the infrared image through the trained haze density prediction model, and perform recognition and prediction on the features, to obtain the haze density information of the each pixel point.

It may be understood that, in the target scene, the distribution of haze may be uneven. Therefore, to accurately describe the distribution of haze in the target scene, the haze density information calculated in the embodiments of this application is not for the entire target scene, but corresponds one by one to the each pixel point of the obtained image in the target scene. In other words, the number of pixel points in the image in the target scene is the same as the amount of the haze density information.

S103. Generate an image fusion factor of the each pixel point according to the haze density information, where the image fusion factor is used for controlling a fusion degree of the color image and the infrared image. In some implementations, S103 may include generating, an image fusion factor of the each pixel according to the haze density information, the image fusion factor indicating a fusion degree between the color image and the infrared image. In some other implementations, S103 may include generating, by the device, an image fusion factor of the each pixel according to the haze density information, the image fusion factor indicating a fusion degree between the first image and the second image.

The image dehazing device generates the image fusion factor of the each pixel point according to the calculated haze density information of the each pixel point, to control fusion of the color image and the infrared image using the image fusion factor and use information in the infrared image to complement missing information in the color image due to haze. Because the distribution of haze is uneven, in the color image, a degree of information missing of each the pixel point is different. Therefore, the image dehazing device generates the image fusion factor for the each pixel point, to use the information of the color image in an area with lower haze density and use more information of the infrared image in an area of heavy haze.

In some embodiments of this application, the image dehazing device may directly compare the haze density information of the each pixel point with a preset fusion parameter, to generate the image fusion factor of the each pixel point, or may compare the haze density information of the each pixel point with haze density information of other pixel points, to generate the image fusion factor of the each pixel point. This is not limited in the embodiments of this application.

S104. Fuse the color image and the infrared image according to the image fusion factor, to obtain a dehazed image. In some implementations, S104 may include fusing, by the device, the first image and the second image according to the image fusion factor to obtain a dehazed image.

After generating the image fusion factor, the image dehazing device may assign fusion weights to the pixel value of the each pixel point of the color image and the pixel value of the each pixel point of the infrared image in combination with the image fusion factor of the each pixel point. Then, the image dehazing device fuses the pixel value of the each pixel point of the color image and the pixel value of the each pixel point of the infrared image according to the fusion weights, and an image finally obtained is the dehazed image. In this way, the image dehazing device completes the entire image dehazing process.

In the embodiments of this application, the image dehazing device may fuse the color image and the infrared image in an RGB space according to the fusion weights, to obtain the dehazed image; or map the color image to YUV space, then fuse the color image and the infrared image, and map the fused image reversely to the RGB space, to obtain the dehazed image.

Figure 4A:
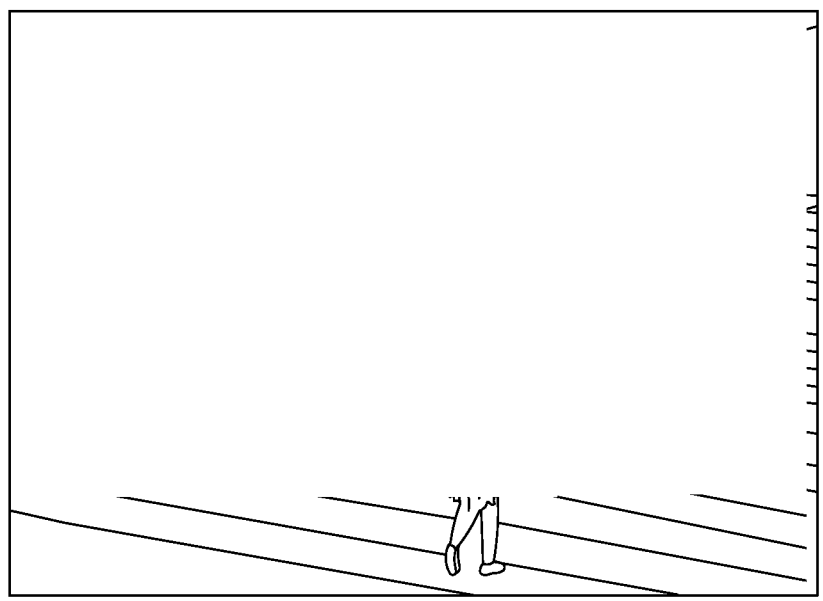
FIG. 4(a) is a schematic diagram of a pre-dehazed color image according to an embodiment of this application.
Figure 4B:
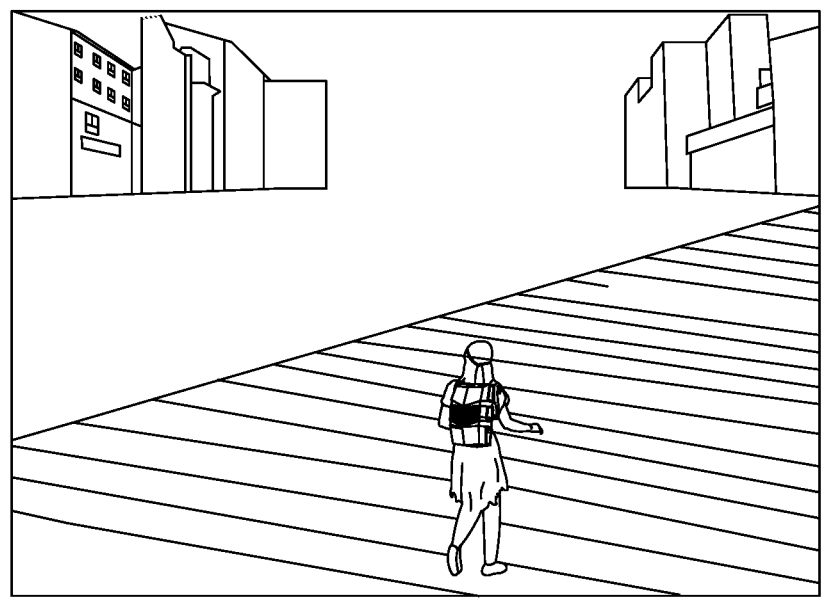
FIG. 4(b) is a schematic diagram of a dehazed image according to an embodiment of this application.

Exemplarily, the embodiments of this application provide a schematic diagram of an image dehazing process. FIG. 4(a) is a schematic diagram of a pre-dehazed color image according to an embodiment of this application. It can be learned from the figure that the entire image is hazy due to a haze effect of the image and quality of the image is low. The image dehazing device calculates the haze density information of the each pixel point according to the pixel value of the each pixel point of the color image and the pixel value of the each pixel point of the infrared image obtained at the same moment with the color image, then generates the image fusion factor of the each pixel point based on the haze density information, and finally fuses the color image and the infrared image according to the image fusion factor, to obtain the dehazed image. FIG. 4(b) is a schematic diagram of a dehazed image according to an embodiment of this application. It can be learned that the dehazed image has a clearer image effect and higher quality by comparing FIG. 4(a) and FIG. 4(b).

In the embodiments of this application, when haze exists in the target scene, the terminal receives an image dehazing instruction, acquires the color image and the infrared image corresponding to the target scene at the same moment in response to the image dehazing instruction, and then calculates the haze density information of the each pixel point according to the pixel value of the each pixel point of the color image and the pixel value of the each pixel point of the infrared image. Next, the terminal generates the image fusion factor of the each pixel point based on the haze density information, and finally fuses the color image and the infrared image according to the image fusion factor, to obtain the dehazed image. In this way, the terminal can control the fusion degree of the color image and the infrared image using the image fusion factor, so that when the haze density is higher, information missing in the color image due to haze is complemented using more information of the infrared image, to improve quality of the dehazed image, thereby improving an image dehazing effect.

In some embodiments of this application, the haze density information of the each pixel point is calculated based on the pixel value of the each pixel point of the color image and the pixel value of the each pixel point of the infrared image, which is the implementation process of S102, and may include S1021 to S1022 as follows:

S1021. Extract a blue-light brightness value of the each pixel point from the pixel value of the each pixel point of the color image, and use the pixel value of the each pixel point of the infrared image as an infrared brightness value of the each pixel point.

Because in the visible light, the blue light has the shortest wavelength and is most likely to be affected by haze, the penetration degree of the blue light highly varies with haze density. Therefore, to make a difference between the infrared light and the visible light be more obvious in haze penetration, the image dehazing device may extract only the brightness of the blue-light channel in the visible light. In this case, the image dehazing device reads one by one the pixel value of the each pixel point of the color image, and extract a pixel value of the blue-light channel of the each pixel point from the pixel value of the each pixel point as a blue-light brightness value. In addition, the image dehazing device further directly uses the pixel value of the each pixel point of the infrared image as an infrared brightness value of the each pixel point, so that the haze density information is subsequently calculated according to the blue-light brightness value and the infrared brightness value.

Exemplarily, when a pixel value of a pixel point of the color image is (0, 125, 255), the image dehazing device extracts the pixel value 255 of the blue-light channel as a blue-light brightness value of the pixel point.

S1022. Calculate the haze density information of the each pixel point according to a difference between the blue-light brightness value and the infrared brightness value.

After obtaining the blue-light brightness value and the infrared brightness value of the each pixel point, the image dehazing device first calculates the difference between the blue-light brightness value and the infrared brightness value for the each pixel point, and then calculates the haze density information of the each pixel point according to the calculated difference.

In some embodiments of this application, the image dehazing device may perform subtraction on the blue-light brightness value and the infrared brightness value of the each pixel point, and directly uses the obtained difference result as the difference between the blue-light brightness value and the infrared brightness value of the each pixel point. In some other embodiments of this application, after performing subtraction on the blue-light brightness value and the infrared brightness value of the each pixel point to obtain the difference result, the image dehazing device may further perform other processing such as scaling or normalization on the difference result, and the processed difference result is used as the difference between the blue-light brightness value and the infrared brightness value of the each pixel point. A manner of calculating the difference between the blue-light brightness value and the infrared brightness value may be set according to an actual situation. This is not limited in the embodiments of this application.

In the embodiments of this application, the image dehazing device may first extract the blue-light brightness value from the pixel value of the color image and directly use the pixel value of the infrared image as the infrared brightness value, to obtain the blue-light brightness value and the infrared brightness value of the each pixel point. Next, the image dehazing device calculates the haze density information of the each pixel point based on the difference between the blue-light brightness value and the infrared brightness value of the each pixel point. In this way, the image dehazing device can obtain the haze density information of the each pixel point, and further learn the distribution of the haze density in the target scene.

Figure 5:
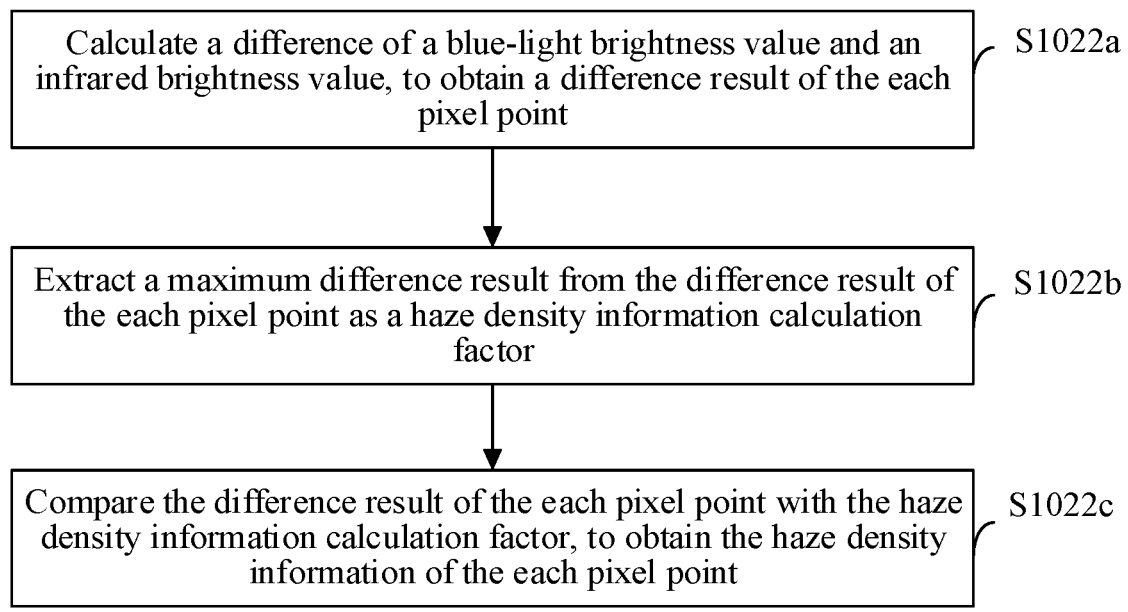
FIG. 5 is a schematic flowchart 2 of an image dehazing method according to an embodiment of this application.

FIG. 5 is a schematic flowchart 2 of an image dehazing method according to an embodiment of this application. In some embodiments of this application, the haze density information of the each pixel point is calculated based on the difference between the blue-light brightness value and the infrared brightness value, which is the implementation process of S1022, and may include S1022a to S1022c as follows:

S1022a. Calculate the difference of the blue-light brightness value and the infrared brightness value, to obtain a difference result of the each pixel point.

When calculating the haze density information, the image dehazing device may first subtract the infrared brightness value from the blue-light brightness value, to obtain a temporary difference of the each pixel point, and then take the absolute value of the temporary value, to obtain a non-difference result. The image dehazing device may alternatively subtract the blue-light brightness value from the infrared brightness value, to obtain the difference result of the each pixel point. In this way, the image dehazing device can visually and clearly learn the difference between the visible light and the infrared light in the haze penetration through a magnitude of the numeric value of the difference result.

Exemplarily, when the blue-light brightness value of the each pixel point is represented as $I^{blue}(x, y)$, and the infrared brightness value of the each pixel point is represented as $I^{nir}(x, y)$, a non-negative difference result of the each pixel point may be represented as $|I^{blue}(x, y) - I^{nir}(x, y)|$, where (x, y) is coordinates of the pixel point.

S1022b. Extract a maximum difference result from the difference result of the each pixel point as a haze density information calculation factor.

After obtaining the difference result of the each pixel point, the image dehazing device compares the difference results of all pixel points, determines a maximum difference result from the difference results of all pixel points, and extracts the maximum difference result as the haze density information calculation factor.

Exemplarily, when the difference result of the each pixel point is $|I^{blue}(x, y) - I^{nir}(x, y)|$, the haze density information calculation factor may be represented as $$\max_{x,y \in S}(|I^{blue}(x, y) - I^{nir}(x, y)|),$$

(x, y) is coordinates of the pixel point, and S is a set including all the pixel points.

S1022c. Compare the difference result of the each pixel point with the haze density information calculation factor, to obtain the haze density information of the each pixel point.

The image dehazing device calculates a ratio of the difference result to the haze density information calculation factor for the each pixel point using the difference result of the each pixel point as a dividend and using the haze density information calculation factor as a divisor, where the ratio is the haze density information. In some embodiments, the image dehazing device may alternatively perform scaling using the haze density information calculation factor as a dividend and using the difference result of the each pixel point as a divisor, where the obtained ratio is the haze density information.

Exemplarily, the embodiments of this application provide a formula for calculating the haze density information of the each pixel point, as shown in formula (1):

$$d^{N-B}(x, y) = \frac{|I^{blue}(x, y) - I^{nir}(x, y)|}{\max_{x,y \in S}(|I^{blue}(x, y) - I^{nir}(x, y)|)} \quad (1)$$

$I^{blue}(x, y)$ is the blue-light brightness value, $I^{nir}(x, y)$ is the infrared brightness value, (x, y) is coordinates of the pixel point, S is a set including all pixel points, and $d^{N-B}(x, y)$ is the haze density information. After obtaining numeric values of the blue-light brightness value $I^{blue}(x, y)$ and the infrared brightness value $I^{nir}(x, y)$, the image dehazing device may calculate the numeric value of the haze density information $d^{N-B}(x, y)$ for the each pixel point.

In the embodiments of this application, the image dehazing device may first calculate the difference result of the blue-light brightness value and the infrared brightness value of the each pixel point, then extract the maximum difference result from the difference result of the each pixel point as the haze density information calculation factor, and finally compare the difference result of the each pixel point with the haze density information calculation factor, where the finally obtained ratio is the haze density information. In this way, the image dehazing device can obtain the haze density information through calculation, and further learn the distribution of the haze density in the target scene.

In some embodiments of this application, after the calculating, based on a pixel value of each pixel point of the color image and a pixel value of each pixel point of the infrared image, haze density information of the each pixel point, and before the generating an image fusion factor of the each pixel point according to the haze density information, that is, after S102, and before S103, the method may further include S105 to S106 as follows:

S105. Calculate a dark channel value of the each pixel point according to the pixel value of the each pixel point of the color image.

After calculating the haze density information of the each pixel point, the image dehazing device may further calculate the dark channel value for the each pixel point, and optimize the haze density information using the calculated dark channel value. The dark channel value means that in a non-sky area, some pixels have at least one color channel with a low value. However, when haze exists in the target scene, transmittance of the visible light decreases, so that overall brightness of an image captured by a color image pickup device increases, and the dark channel value increases. Therefore, the image dehazing device can assist in determining the haze density in the target scene according to the dark channel value.

S106. Compare the haze density information with the dark channel value, to obtain a comparison result, and generate optimized haze density information for the each pixel point according to the comparison result.

The image dehazing device compares the haze density information with the dark channel value, to obtain the comparison result for the each pixel point. When the comparison result indicates that the dark channel value is less than the haze density information, the image dehazing device selects the dark channel value as the optimized haze density information; and when the comparison result indicates that the dark channel value is greater than the haze density information, the image dehazing device still uses the haze density information as the optimized haze density information. In other words, the image dehazing device may select the smaller one from the dark channel value and the haze density information as the optimized haze density information, to correct and optimize the haze density information using the dark channel value.

Exemplarily, the embodiments of this application provide a formula for calculating the optimized haze density information, as shown in formula (2):

$$D_{haze}(x,y)=\min(d^{N-B}(x,y), J^{dark}(x,y)) \qquad (2)$$

$d^{N-B}(x, y)$ is the haze density information, $J^{dark}(x, y)$ is the dark channel value, $D_{haze}(x, y)$ is the optimized haze density information, and (x, y) is coordinates of the pixel point. After learning numeric values of the haze density information $d^{N-B}(x, y)$ and the dark channel value $J^{dark}(x, y)$, the image dehazing device may substitute the numeric values of the above parameters into formula (2), to obtain the numeric value of the optimized haze density information $D_{haze}(x, y)$.

It may be understood that, after the image dehazing device obtains the optimized haze density information, the process of generating an image fusion factor of the each pixel point according to the haze density information, that is, the implementation process of S103, correspondingly changes into the process of generating the image fusion factor of the each pixel point according to the optimized haze density information.

In the embodiments of this application, the image dehazing device may alternatively calculate the dark channel value for the each pixel point, then compare the haze density information with the dark channel value, and select the smaller one as the optimized haze density information. In this way, the image dehazing device can correct and optimize the haze density information using the dark channel value, so that the obtained optimized haze density information can more accurately describe the distribution of the haze density in the target scene, and the subsequently calculated image fusion factor is more accurate.

In some embodiments of this application, the dark channel value of the each pixel point is calculated according to the pixel value of the each pixel point of the color image, which is the implementation process of S105, and may include S1051 to S1054 as follows:

S1051. Obtain a blue-light brightness value, a red-light brightness value, and a green-light brightness value respectively from the pixel value of the each pixel point of the color image.

For the pixel value of the each pixel point of the color image, the image dehazing device reads a pixel value of a blue-light channel as a blue-light brightness value, and reads a pixel value of a red-light channel as a red-light brightness value, and reads a pixel value of a green-light channel as a green-light brightness value, so that the image dehazing device subsequently computes the dark channel value according to the blue-light brightness value, the green-light brightness value, and red-light brightness value.

S1052. Select a minimum brightness value from the blue-light brightness value, the red-light brightness value, and the green-light brightness value as a candidate brightness value of the each pixel point.

The image dehazing device compares magnitudes of the blue-light brightness value, the red-light brightness value, and the green-light brightness value of the each pixel point, to determine a magnitude relationship among the blue-light brightness value, and the red-light brightness value, and the green-light brightness value of the each pixel point, and then selects the minimum brightness value from the brightness values of the three channels as the candidate brightness value of the each pixel point, so that the dark channel value is subsequently determined from the candidate brightness value.

Exemplarily, when the brightness value of each channel at the each pixel point is represented as $J^C(x, y)$, the candidate brightness value of the each pixel point may be represented as $$\min_{C \in \{R,G,B\}} J^C(x, y).$$

R is the red-light channel, G is the green-light channel, and B is the blue-light channel.

S1053. Determine all pixel points in a preset pixel range as neighborhood pixel points for the each pixel point.

The image dehazing device, using a pixel point as a center, determines all the pixel points in the preset pixel range as the neighborhood pixel points of the pixel point. The image dehazing device may obtain a neighborhood pixel point corresponding to the each pixel point by performing this operation on the each pixel point.

In the embodiments of this application, the preset pixel range may be set according to an actual situation. For example, the preset pixel range may be set as 2×2, that is, the image dehazing device uses four pixel points including an upper pixel point, a lower pixel point, a left pixel point, and a right pixel point of the each pixel point as the neighborhood pixel points, or the preset pixel range may be set as 3×3, that is, the image dehazing device uses eight pixel points surrounding the each pixel point as the neighborhood pixel points. This is not limited in the embodiments of this application.

S1054. Select a minimum candidate brightness value from candidate brightness values of the neighborhood pixel points as the dark channel value of the each pixel point.

Because each of the neighborhood pixel points has a corresponding candidate brightness value, the image dehazing device selects, for the each pixel point, the minimum candidate brightness value from the candidate brightness values corresponding to the neighborhood pixel points of the each pixel point as the dark channel value of the each pixel point. Exemplarily, when four pixel points including an upper pixel point, a lower pixel point, a left pixel point, and a right pixel point of a pixel point are used as the neighborhood pixel points, the image dehazing device selects a minimum candidate brightness value from the candidate brightness values respectively corresponding to the four pixel points including the upper pixel point, the lower pixel point, the left pixel point, and the right pixel point as the dark channel value of the pixel point.

Exemplarily, the embodiments of this application provide a formula for calculating the dark channel value, as shown in a formula (3):

$$J^{dark}(x, y) = \min_{x,y \in W} \left( \min_{C \in \{R,G,B\}} J^C(x, y) \right) \qquad (3)$$

$J^C(x, y)$ is the brightness value of each channel of the each pixel point, $$\min_{C \in \{R,G,B\}} J^C(x, y)$$

is the candidate brightness value of the each pixel point, W is a window determined using the each point and the preset pixel range, and $J^{dark}(x, y)$ is the dark channel value. After learning numeric values of the above parameters, the image dehazing device may substitute the numeric values of the above parameters into formula (3), to obtain the dark channel value of the each pixel point.

In the embodiments of this application, the image dehazing device may first obtain the blue-light brightness value, the red-light brightness value, and the green-light brightness value of the each pixel point of the color image, select the minimum brightness value from the three brightness values of the three channels as the candidate brightness value, then determine the neighborhood pixel points for the each pixel point, and select the minimum candidate brightness value from the candidate brightness values corresponding to the neighborhood pixel points as the dark channel value of the each pixel point. In this way, the image dehazing device can complete the process of calculating the dark channel value for the each pixel point, so that the haze density information is subsequently optimized using the dark channel value.

In some embodiments of this application, the image fusion factor of the each pixel point is generated according to the haze density information, which is the implementation process of S103, and may include S1031 to S1032 as follows:

S1031. Select maximum haze density information from the haze density information.

S1032. Compare the haze density information with the maximum haze density information, to obtain the image fusion factor of the each pixel point.

The image dehazing device first compares a magnitude of the haze density information of the each pixel point, and selects and marks the maximum haze density information. Then, the image dehazing device compares all the haze density information of the each pixel point with the selected maximum haze density information, where the obtained ratio result is the image fusion factor of the each pixel point.

When fusing the color image and the infrared image, the image dehazing device uses information in the infrared image to complement brightness information in the color image, instead of simply superimposing brightness of the infrared image and the color image. Therefore, the image fusion factor needs to be less than 1, and the haze density information may be compared with the maximum haze density information to achieve this objective.

Exemplarily, the embodiments of this application provide a formula for calculating the image fusion factor, as shown in formula (4):

$$w(x, y) = \frac{d^{N-B}(x, y)}{\max_{x,y \in S}\left(d^{N-B}(x, y)\right)} \quad (4)$$

$d^{N-B}(x, y)$ is the haze density information, $$\max_{x,y \in S}\left(d^{N-B}(x, y)\right)$$

is the maximum haze density information, w(x, y) is the image fusion factor, and S is a set including all the pixel points. After learning numeric values of the haze density information and the maximum haze density information, the image dehazing device substitutes the numeric values into formula (4), to obtain the numeric value of the image fusion factor.

In the embodiments of this application, the image dehazing device may first select the maximum haze density information from the haze density information, then compare the haze density information with the maximum haze density information, and use the ratio result as the image fusion factor. In this way, the image dehazing device can obtain the image fusion factor, so that fusion of the color image and the infrared image is subsequently controlled using the image fusion factor.

Figure 6:
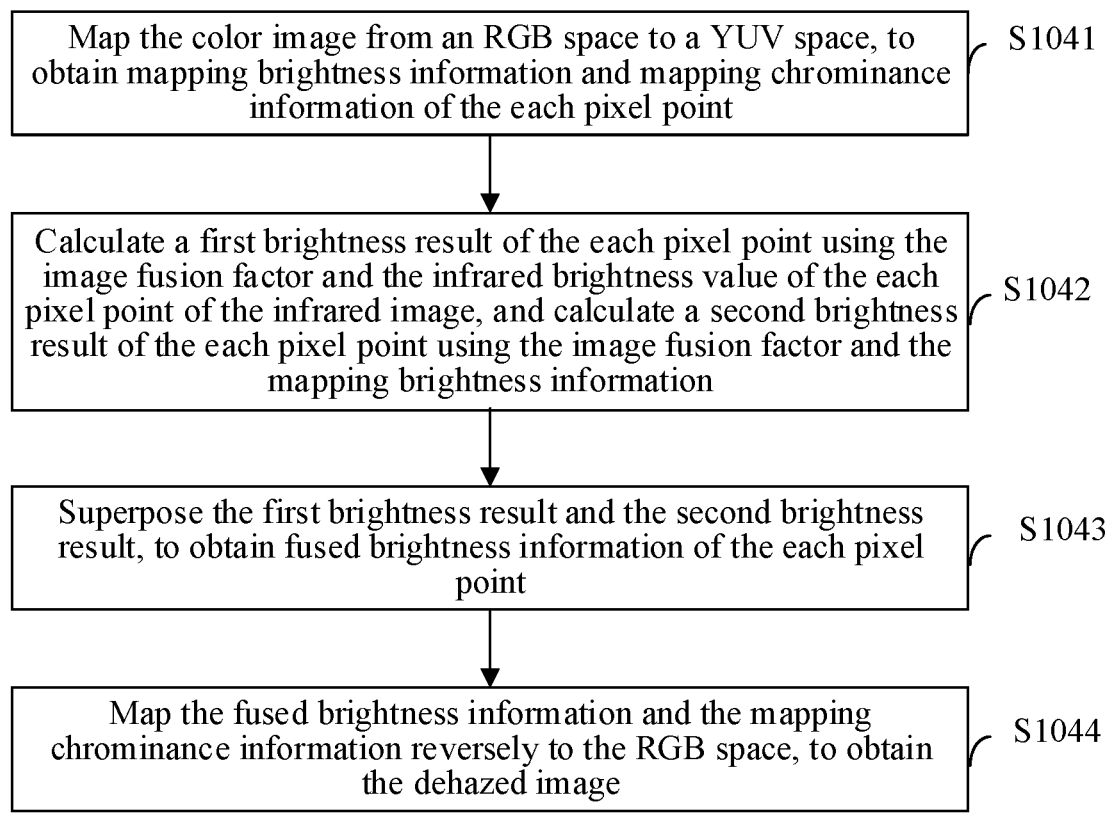
FIG. 6 is a schematic flowchart 3 of an image dehazing method according to an embodiment of this application.

FIG. 6 is a schematic flowchart 3 of an image dehazing method according to an embodiment of this application. In some embodiments of this application, the color image and the infrared image are fused according to the image fusion factor, to obtain the dehazed image, which is the implementation process of S104, and may include S1041 to S1044 as follows:

S1041. Map the color image from an RGB space to a YUV space, to obtain mapping brightness information and mapping chrominance information of the each pixel point. In some implementations, the mapping brightness information may be referred as a mapped brightness value; and/or mapping chrominance information may be referred as a mapped chrominance value. S1041 may include mapping the color image from an RGB space to a YUV space, to obtain a mapped brightness value and a mapped chrominance value of the each pixel.

In the embodiments of this application, when fusing the infrared image and the color image, the image dehazing device first maps the color image from the RGB space to the YUV space, to obtain the mapping brightness information of the each pixel point, that is, Y-channel information, and the mapping chrominance information, that is, U-channel and V-channel information.

It may be understood that, when mapping the color image to the YUV space, the image dehazing device may calculate the mapping brightness information and the mapping chrominance information of the each pixel point respectively according to Y=0.3R+0.59G+0.111B, U=0.493(B-Y), and V=0.877(R-Y).

S1042. Calculate a first brightness result of the each pixel point using the image fusion factor and the infrared brightness value of the each pixel point of the infrared image, and calculate a second brightness result of the each pixel point using the image fusion factor and the mapping brightness information. In some implementations, S1042 may include calculating a first brightness result of the each pixel based on the image fusion factor and the second pixel value of the each pixel of the infrared image, and calculating a second brightness result of the each pixel using the image fusion factor and the mapped brightness value.

After obtaining the mapping brightness information and the mapping chrominance information, the image dehazing device may fuse the infrared image and the color image using the mapping brightness information. In this case, the image dehazing device first weights the infrared brightness value using the image fusion factor, or performs exponent operation on the infrared brightness value using the image fusion factor, to obtain the first brightness result of the each pixel point, that is, brightness information needing to be complemented from the infrared image. Then, the image dehazing device calculates the second brightness result of the each pixel point using the image fusion factor and the mapping brightness information, the second brightness result being brightness information needing to be provided from the color image. For example, the mapping brightness information and the image fusion factor are multiplied, to obtain the second brightness result.

S1043. Superpose the first brightness result and the second brightness result, to obtain fused brightness information of the each pixel point.

S1044. Map the fused brightness information and the mapping chrominance information reversely to the RGB space, to obtain the dehazed image. In some implementations, S1044 may include reversely mapping the fused brightness information and the mapped chrominance value from the YUV space to the RGB space, to obtain the dehazed image.

After obtaining the first brightness result and the second brightness result, the image dehazing device superposes the first brightness result and the second brightness result, and uses the finally superposed result as the fused brightness information of the each pixel point. Then, the image dehazing device combines the fused brightness information and the original mapping chrominance information, and uses the reverse mapping from YUV to RGB, to obtain the final dehazed image.

In the embodiments of this application, the image dehazing device may first map the color image to the YUV space, to obtain the mapping brightness information and the mapping chrominance information of the each pixel point, then fuse the infrared brightness value and the mapping brightness information in combination with the image fusion factor, to obtain the fused brightness information of the each pixel point, and finally map the fused brightness information in combination with the mapping chrominance information reversely to the color image, to obtain the dehazed image. In this way, the image dehazing device can use the brightness information of the infrared image to complement the brightness information of the color image, to obtain a dehazed image of higher quality.

Figure 7:
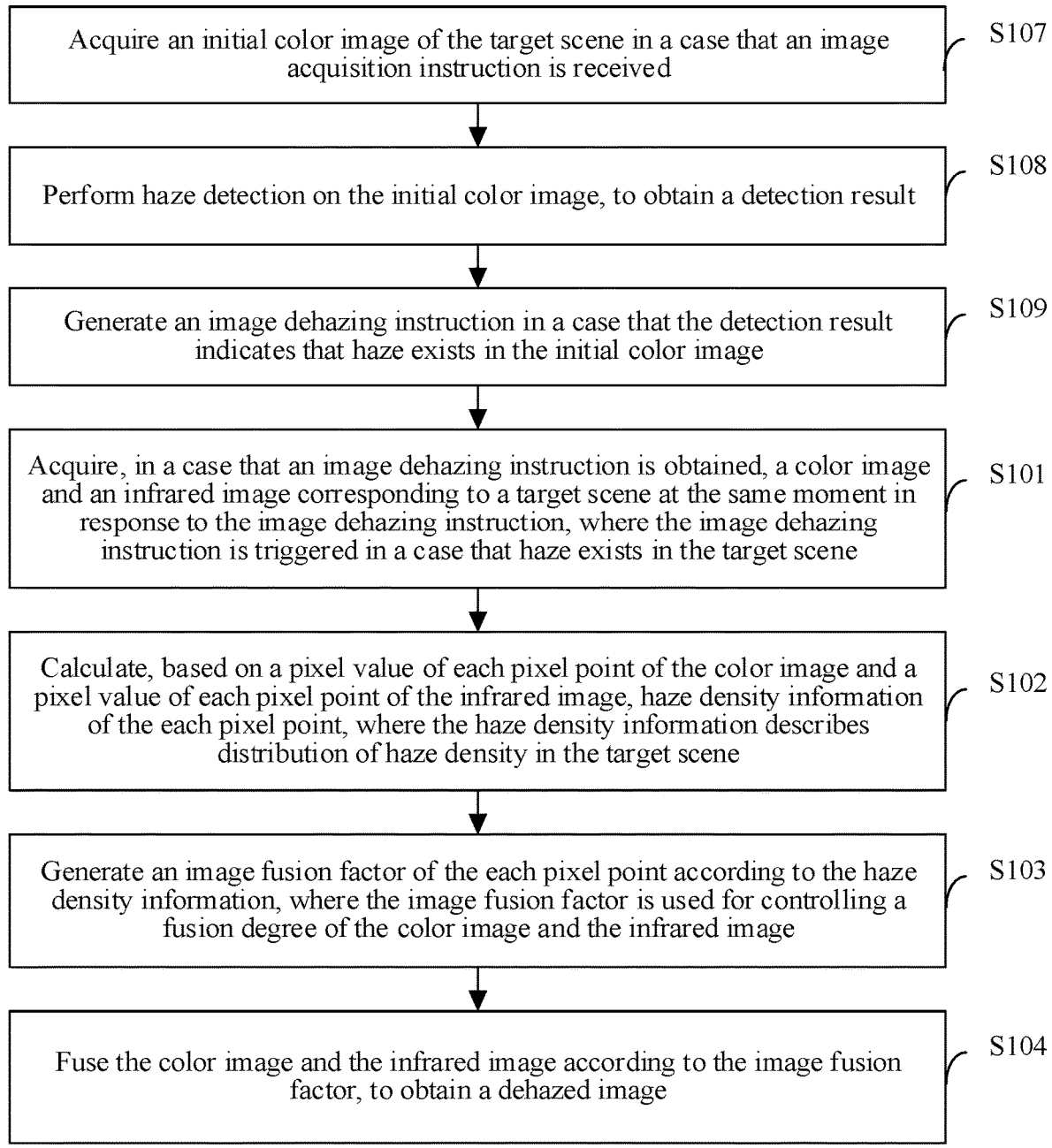
FIG. 7 is a schematic flowchart 4 of an image dehazing method according to an embodiment of this application.

Based on FIG. 3, FIG. 7 is a schematic flowchart 4 of an image dehazing method according to an embodiment of this application. In some embodiments of this application, before the acquiring, when an image dehazing instruction is obtained, a color image and an infrared image corresponding to a target scene at the same moment in response to the image dehazing instruction, that is, before S101, the method may further include S107 to S109 as follows:

S107. Acquire an initial color image of the target scene when an image acquisition instruction is received. In some implementations, the initial color image of the target scene may not need to be color, it may be a black-white (or a grey scale), or it may be an infrared image (e.g., during low-light conditions). In some implementations, S107 may include acquiring an initial image of the target scene.

S108. Perform haze detection on the initial color image, to obtain a detection result. In some implementations, S108 may include performing haze detection on the initial image, to obtain a detection result.

Before obtaining the image dehazing instruction, the image dehazing device needs to first generate the image dehazing instruction. The image dehazing device first acquires the initial color image of the target scene when the image acquisition instruction is received, and detects whether haze exists in the initial color image, to obtain the detection result.

It may be understood that, the image acquisition instruction may be an instruction triggered by a user and indicates that the user needs to start to acquire an image in the target scene. Exemplarily, when identity verification is performed on an image including a human face in the target scene, the image acquisition instruction may be triggered after the user enables an identity verification function. The image acquisition instruction may alternatively be triggered regularly by an image acquisition device and indicates that the image acquisition device needs to regularly acquire an image in the target scene. Exemplarily, a vehicle situation at each crossroad is acquired regularly at 7 am every day.

The image dehazing device may automatically detect whether haze exists in the initial color image using a machine learning method or a deep learning method. For example, the image dehazing device may train a deep learning model using a hazy training picture. After obtaining the initial color image, the image dehazing device uses the deep learning model to perform haze detection on the initial color image, where a result outputted by the deep learning model is the detection result. The image dehazing device may alternatively automatically determine whether haze exists in the initial color image through entire brightness and chrominance of the image. For example, when the entire brightness is high and the chrominance is low, it is determined that haze exists in the initial color image.

S109. Generate the image dehazing instruction when the detection result indicates that haze exists in the initial color image.

In some implementation, S109 may include determining whether the detection result indicates that haze exists in the initial image; and/or in response to determining that the detection result indicates that the haze exists in the initial image, generating the image dehazing instruction.

When the detection result obtained by the image dehazing device indicates that haze exists in the color image, the image dehazing device generates the image dehazing instruction, so that an image dehazing function is subsequently triggered according to the image dehazing instruction, to obtain the dehazed image of the target scene. When the detection result obtained by the image dehazing device indicates that no haze exists in the color image, the image dehazing device dose not generate the image dehazing instruction. In this case, the image dehazing device directly completes a subsequent function such as identity verification or security monitoring based on the initial color image without entering the image dehazing process.

In the embodiments of this application, when the image acquisition instruction is received, the image dehazing device acquires the initial color image of the target scene, and performs the haze detection on the initial color image, to obtain the detection result. Only when the detection result indicates that haze exists in the initial color image, the image dehazing device generates the image dehazing instruction, to trigger the image dehazing function. In this way, the image dehazing device can determine whether to enter the image dehazing process according to an actual situation of the target scene, so that when no haze exists in the target scene, no image dehazing is performed, to save processing time.

In some embodiments of this application, the first brightness result of the each pixel point is calculated using the image fusion factor and the infrared brightness value of the each pixel point of the infrared image, and the second brightness result of the each pixel point is calculated using the image fusion factor and the mapping brightness information, which is the implementation process of S1042, and may include S1042a to S1042b as follows:

S1042a. Multiply the image fusion factor by the infrared brightness value, to obtain the first brightness result.

The image dehazing device directly multiplies the image fusion factor by the infrared brightness value, and uses the obtained product as the first brightness result.

Exemplarily, when the image fusion factor is represented as w(x, y) and the infrared brightness value is represented as $I_{nir}(x, y)$, the obtained first brightness result may be represented as $w(x, y) \times I_{nir}(x, y)$.

S1042b. Multiply the mapping brightness information by the image fusion factor, to obtain a product result, and perform subtraction on the mapping brightness information and the product result, to obtain the second brightness result.

The image dehazing device first multiplies the mapping brightness information by the image fusion factor, to obtain a product result, and then subtracts the product result from the mapping brightness information, where the obtained difference is the second brightness result.

Exemplarily, when the image fusion factor is represented as w(x, y) and the mapping brightness information is represented as $I_{vis}(x, y)$, the second brightness result may be represented as $(1-w(x, y)) \times I_{vis}(x, y)$.

In the embodiments of this application, the image dehazing device first multiplies the image fusion factor by the infrared brightness value, to obtain the first brightness result, then multiplies the mapping brightness information by the image fusion factor, to obtain the product result, and finally performs subtraction on the mapping brightness information and the product result, to obtain the second brightness result. In this way, the image dehazing device can calculate the first brightness result and the second brightness result, so that the fused brightness information is subsequently calculated according to the first brightness result and the second brightness result.

In some embodiments of this application, after the comparing the haze density information with the maximum haze density information, to obtain the image fusion factor of the each pixel point, that is, after S1032, the method may further include S1033 as follows:

S1033. Perform filter optimization on the image fusion factor, to obtain an optimized image fusion factor.

When the haze density information is directly compared with the maximum haze density information, and the infrared image and the color image are fused using the obtained image fusion factor, there may be an effect such as a halo or a double image in the dehazed image, affecting quality of the dehazed image. To avoid the problem, in the embodiments of this application, after obtaining the image fusion factor, the image dehazing device may perform the filter optimization on the image fusion factor using a filter, to obtain the optimized image fusion factor, and subsequently fuse the color image and the infrared image according to the optimized image fusion factor, to obtain the dehazed image, to further improve the quality of the dehazed image. That is, after the image dehazing device obtains the optimized image fusion factor, the process of fusing the color image and the infrared image according to the image fusion factor, that is, the implementation process of S104, correspondingly changes to the process of fusing the color image and the infrared image according to the optimized image fusion factor, to obtain the dehazed image.

In the embodiments of this application, the image dehazing device may select a guided image filter to smooth the image fusion factor, or select a mean filter to smooth the image fusion factor, or may select a filter of another type to smooth the image fusion factor. This is not limited in the embodiments of this application.

In the embodiments of this application, after obtaining the image fusion factor, the image dehazing device may perform the filter optimization on the image fusion factor, to obtain the optimized image fusion factor, so that the image dehazing device may subsequently control the fusion of the color image and the infrared image based on the optimized image fusion factor, to obtain the dehazed image of higher quality.

An exemplary application of the embodiments of this application in an actual application scenario is described below.

Figure 8:
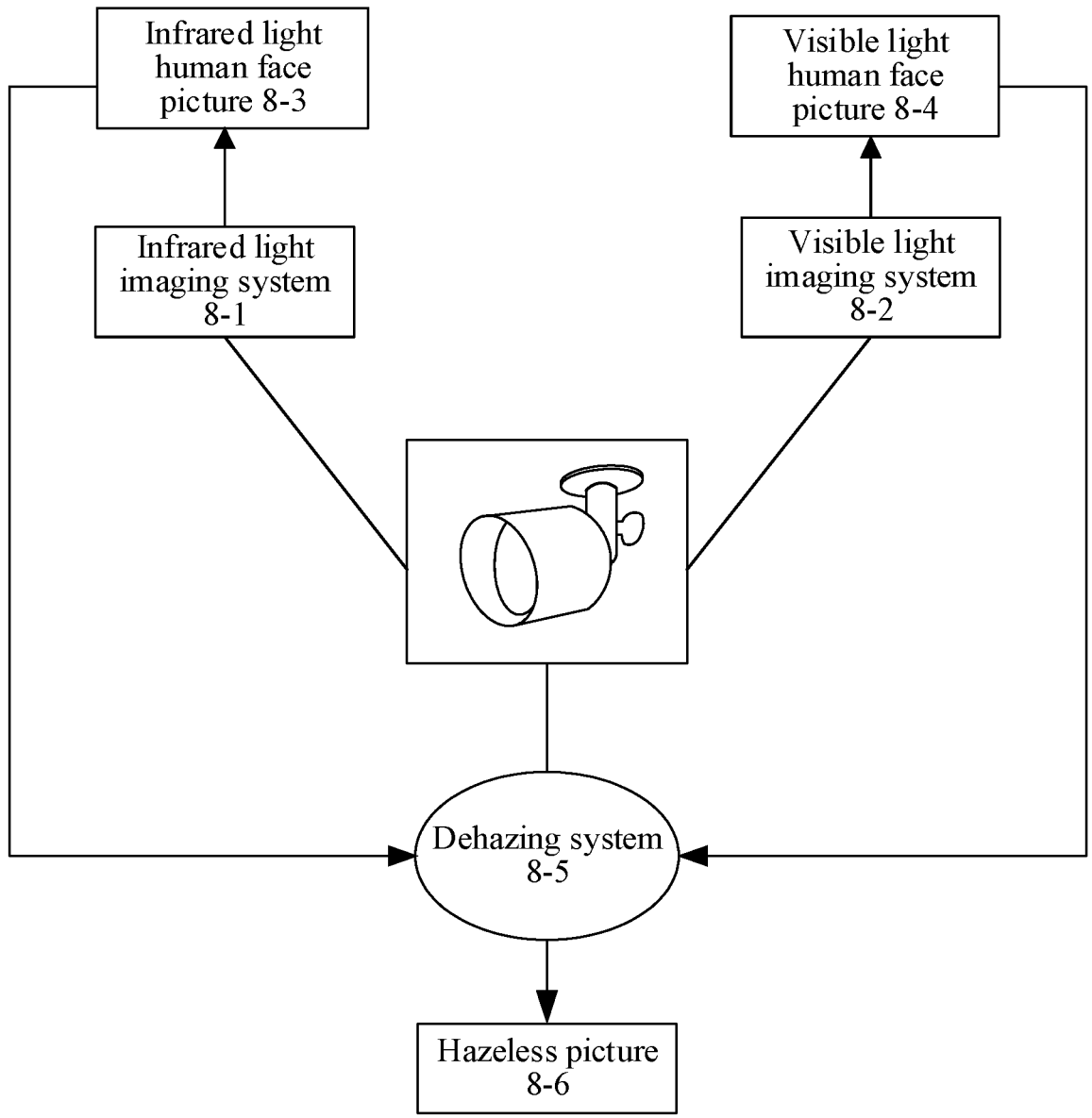
FIG. 8 is a schematic diagram of an image pickup system according to an embodiment of this application.

The embodiments of this application are implemented using a scenario in which a human face is used to perform identity verification. FIG. 8 is a schematic diagram of an image pickup system according to an embodiment of this application. The image pickup system (the image dehazing device) includes an infrared light imaging system 8-1 and a visible light imaging system 8-2. The infrared light imaging system 8-1 acquires an infrared light human face picture 8-3 (an infrared image) of a human face, and the visible light imaging system 8-2 acquires a visible light human face picture 8-4 (a color image) of the human face. Then, the image pickup system transmits the infrared light human face picture 8-3 and the visible light human face picture 8-4 together to a dehazing system 8-5, to obtain a hazeless picture 8-6 (a dehazed image) of the human face.

Because infrared light has a wavelength greater than that of all visible light and may penetrate haze to form an image, when the depth of field and the haze density change, a penetration degree changes a little. However, among blue light, red light, and green light of the visible light, the blue light has a shortest wavelength, and a penetration degree of the blue light highly changes as the depth of field and the haze density. Therefore, by analyzing a brightness difference between the infrared channel and the blue-light channel, the haze density information may be obtained. In this case, the image pickup system may calculate the brightness difference between the infrared channel and the blue-light channel according to formula (1). In the embodiments of this application, the result obtained through formula (1) is a brightness difference factor (the haze density information).

Because in a partial non-sky area, some pixel points have at least one color channel with a low value. Therefore, the image pickup system may further calculate a value of a dark channel (the dark channel value), to represent the haze density. In the embodiments of this application, the image pickup system may calculate the dark channel value according to formula (3).

Then, the image pickup system selects a smaller one from the brightness difference factor and the dark channel value of a pixel point as atmosphere haze particle distribution (the optimized haze density information) of the pixel point, that is, the atmosphere haze particle distribution of the each pixel point is obtained through formula (2), to obtain an atmosphere haze particle distribution diagram.

Although the infrared light human face picture 8-3 may clearly reflect scene information in a hazy area, there exist problems of much noise, low contrast, and insufficient details, and when the image pickup system uses an inappropriate noise reduction method, final quality of an image is reduced due to these inherent shortcomings. Compared with the infrared light human face picture 8-3, the visible light human face picture 8-4 has higher definition, and infrared information does not need to be added during noise reduction to degenerate visible light information. Based on this, the image pickup system may fuse the infrared light human face picture 8-3 and the visible light human face picture 8-4, and more infrared information is used in an area with higher haze density, and the visible light information is more used in an area with lower haze density, that is, the haze density determines use degrees of the infrared information and the visible light information.

In this case, the image pickup system may calculate a fusion weighting factor (the image fusion factor) according to formula (5):

$$w(x, y) = \frac{D_{haze}(x, y)}{\max_{x,y \in S}\left(D_{haze}(x, y)\right)} \qquad (5)$$

$D_{haze}(x, y)$ is the atmosphere haze particle distribution, and w(x, y) is the fusion weighting factor.

Because an artificial effect such as a halo or a double image appears when the fusion weighting factor is directly used, based on this, the image pickup system uses the guided image filter to smooth the fusion weighting factor (a filter optimized image fusion factor), to suppress the artificial effect and improve the image quality.

After the image pickup system obtains the fusion weighting factor and performs the filter optimization on the fusion weighting factor, a fusion rule is established according to formula (6), to obtain the hazeless picture 8-6:

$$I(x,y)=w(x,y) \times I_{nir}(x,y)+(1-w(x,y)) \times I_{vis}(x,y) \qquad (6)$$

w(x, y) is the fusion weighting factor, $I_{nir}(x, y)$ is the brightness of the infrared light human face picture 8-3 (the infrared brightness value), $I_{vis}(x, y)$ is the brightness of the visible light human face picture 8-4 (the mapping brightness information), and I(x, y) is the hazeless picture 8-6.

Because the visible light human face picture 8-4 includes brightness information and chrominance information (the mapping chrominance information), and the infrared light human face picture 8-3 includes no chrominance information, before the image fusion, the image pickup system needs to separate the brightness information and the chrominance information of the visible light human face picture 8-4 and extracts the brightness information. That is, the image pickup system maps the visible light human face picture 8-4 from the RGB space to the YUV space, superposes the brightness information and the brightness of the infrared light human face picture 8-3, to obtain a new brightness component (the fused brightness information), and maps the new brightness component in combination with the previous chrominance information reversely to the RGB space, to obtain the dehazed picture 8-6 of the human face.

Through the foregoing manner, the image pickup system can control the fusion of the infrared light human face picture 8-3 and the visible light human face picture 8-4 using the fusion weighting factor, so that the brightness information of the infrared light is used to complement the brightness information of the visible light when the haze density is high, and the quality of the dehazed picture 8-6 is improved.

An exemplary structure that is of the image dehazing apparatus 455 provided in the embodiments of this application and that is implemented as a software module continues to be described below. In some embodiments, as shown in FIG. 2, the software module of the image dehazing apparatus 455 stored in the memory 450 may include:

an image acquisition part 4551, configured to acquire, when an image dehazing instruction is obtained, a color image and an infrared image corresponding to a target scene at the same moment in response to the image dehazing instruction, where the image dehazing instruction is triggered when haze exists in the target scene;

a haze density determining part 4552, configured to calculate, based on a pixel value of each pixel point of the color image and a pixel value of each pixel point of the infrared image, haze density information of the each pixel point, where the haze density information describes distribution of haze density in the target scene;

a factor generating part 4553, configured to generate an image fusion factor of the each pixel point according to the haze density information, where the image fusion factor is used for controlling a fusion degree of the color image and the infrared image; and an image fusion part 4554, configured to fuse the color image and the infrared image according to the image fusion factor, to obtain a dehazed image.

In some embodiments of this application, the haze density determining part 4552 is configured to: extract a blue-light brightness value of the each pixel point from the pixel value of the each pixel point of the color image, and use the pixel value of the each pixel point of the infrared image as an infrared brightness value of the each pixel point, and calculate the haze density information of the each pixel point according to a difference between the blue-light brightness value and the infrared brightness value.

In some embodiments of this application, the haze density determining part 4552 is configured to: calculate a difference between the blue-light brightness value and the infrared brightness value, to obtain a difference result of the each pixel point; extract a maximum difference result from the difference result of the each pixel point as a haze density information calculation factor; and compare the difference result of the each pixel point with the haze density information calculation factor, to obtain the haze density information of the each pixel point.

In some embodiments of this application, the haze density determining part 4552 is further configured to: calculate a dark channel value of the each pixel point according to the pixel value of the each pixel point of the color image; and compare the haze density information with the dark channel value, to obtain a comparison result, and generate optimized haze density information for the each pixel point according to the comparison result.

Correspondingly, the factor generating part 4553 is further configured to generate the image fusion factor of the each pixel point according to the optimized haze density information.

In some embodiments of this application, the haze density determining part 4552 is configured to: obtain a blue-light brightness value, a red-light brightness value, and a green-light brightness value respectively from the pixel value of the each pixel point of the color image; select a minimum brightness value from the blue-light brightness value, the red-light brightness value, and the green-light brightness value as a candidate brightness value of the each pixel point; determine all pixel points in a preset pixel range as neighborhood pixel points for the each pixel point; and select a minimum candidate brightness value from candidate brightness values of the neighborhood pixel points as the dark channel value of the each pixel point.

In some embodiments of this application, the factor generating part 4553 is configured to: select maximum haze density information from the haze density information; and compare the haze density information with the maximum haze density information, to obtain the image fusion factor of the each pixel point.

In some embodiments of this application, the image fusion part 4554 is configured to: map the color image from an RGB space to a YUV space, to obtain mapping brightness information and mapping chrominance information of the each pixel point; calculate a first brightness result of the each pixel point using the image fusion factor and the infrared brightness value of the each pixel point of the infrared image, and calculate a second brightness result of the each pixel point using the image fusion factor and the mapping brightness information; superpose the first brightness result and the second brightness result, to obtain fused brightness information of the each pixel point; and map the fused brightness information and the mapping chrominance information reversely to the RGB space, to obtain the dehazed image.

In some embodiments of this application, the image dehazing apparatus 455 further includes an instruction generating part 4555.

The instruction generating part 4555 is configured to: acquire an initial color image of the target scene when an image acquisition instruction is received; perform haze detection on the initial color image, to obtain a detection result; and generate the image dehazing instruction when the detection result indicates that haze exists in the initial color image.

In some embodiments of this application, the image fusion part 4554 is configured to: multiply the image fusion factor by the infrared brightness value, to obtain the first brightness result; and multiply the mapping brightness information by the image fusion factor, to obtain a product result, and perform subtraction on the mapping brightness information and the product result, to obtain the second brightness result.

In some embodiments of this application, the factor generating part 4553 is configured to perform filter optimization on the image fusion factor, to obtain an optimized image fusion factor.

Correspondingly, the image fusion part 4554 is further configured to fuse the color image and the infrared image according to the optimized image fusion factor, to obtain the dehazed image.

An embodiment of this application provides a computer storage medium storing an executable instruction, where the computer storage medium stores an executable image dehazing instruction, and is configured to cause, when the executable image dehazing instruction is executed by a processor, the processor to implement the image dehazing method provided in the embodiments of this application, such as the method shown in FIG. 3, FIG. 5, FIG. 6, or FIG. 7.

In some embodiments, the computer storage medium may be a memory such as an FRAM, a ROM, a PROM, an EPROM, an EEPROM, a flash memory, a magnetic surface memory, a disc, or a CD-ROM; or the may be any device including one of or any combination of the memories.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

In some embodiments, the executable image dehazing instruction may adopt the form of programs, software, software modules, scripts or codes, be written in any form of programming language (including compiled or interpreted languages, or declarative or procedural languages), and be deployed in any form, including being deployed as an independent program or as a module, component, subroutine or other unit suitable for being used in a computing environment.

As an example, the executable instruction may but do not necessarily correspond to files in the file system, and may be stored as part of the file that saves other programs or data, for example, the executable instruction is stored in one or more scripts of a hypertext markup language (HTML) document, in a single file dedicated to the program discussed, or in multiple coordinated files (for example, a file storing one or more modules, subprograms, or code parts).

As an example, the executable instruction may be deployed to be executed on one calculating device, or on a plurality of calculating devices located in one location, or on a plurality of calculating devices that are distributed in a plurality of locations and interconnected by a communication network.

The foregoing descriptions are merely embodiments of this application, but are not intended to limit this application. Any modification, equivalent replacement, or improvement made without departing from the spirit and scope of this application shall fall within the protection scope of this application.

What is claimed is:

1. A method for performing a dehazing process in an image, the method comprising:
   acquiring, by a device comprising a memory storing instructions and a processor in communication with the memory, a first image and a second image corresponding to a target scene;
   calculating, by the device based on a first pixel value of each pixel of the first image and a second pixel value of each pixel of the second image, haze density information of each pixel, by:
   extracting a blue-light brightness value of each pixel from the first pixel value of each pixel of the first image, and using the second pixel value of each pixel of the second image as an infrared brightness value of each pixel; and calculating the haze density information of each pixel according to a difference between the blue-light brightness value and the infrared brightness value;

generating, by the device, an image fusion factor of each pixel according to the haze density information, the image fusion factor indicating a fusion degree between the first image and the second image; and fusing, by the device, the first image and the second image according to the image fusion factor to obtain a dehazed image.

2. The method according to claim 1, wherein the calculating the haze density information of each pixel according to the difference between the blue-light brightness value and the infrared brightness value comprises:

calculating the difference between the blue-light brightness value and the infrared brightness value, to obtain a difference result of each pixel;

extracting a maximum difference result from the difference result of each pixel as a haze density information calculation factor; and comparing the difference result of each pixel with the haze density information calculation factor, to obtain the haze density information of each pixel.

3. The method according to claim 1, wherein:
the method further comprises:
calculating a dark channel value of each pixel according to the first pixel value of each pixel of the first image,
comparing the haze density information with the dark channel value, to obtain a comparison result, and
generating optimized haze density information for each pixel according to the comparison result; and
the generating the image fusion factor of each pixel according to the haze density information comprises:
generating the image fusion factor of each pixel according to the optimized haze density information.

4. The method according to claim 3, wherein the calculating the dark channel value of each pixel according to the first pixel value of each pixel of the first image comprises:

obtaining a blue-light brightness value, a red-light brightness value, and a green-light brightness value respectively from the first pixel value of each pixel of the first image;

selecting a minimum brightness value from the blue-light brightness value, the red-light brightness value, and the green-light brightness value as a candidate brightness value of each pixel;

determining all pixels located in a preset pixel range as neighborhood pixels for each pixel; and selecting a minimum candidate brightness value from candidate brightness values of the neighborhood pixels as the dark channel value of each pixel.

5. The method according to claim 1, wherein the fusing the first image and the second image according to the image fusion factor to obtain the dehazed image comprises:

mapping the first image from an RGB space to a YUV space, to obtain a mapped brightness value and a mapped chrominance value of each pixel;

calculating a first brightness result of each pixel based on the image fusion factor and the second pixel value of each pixel of the second image, and calculating a second brightness result of each pixel using the image fusion factor and the mapped brightness value;

superposing the first brightness result and the second brightness result, to obtain fused brightness information of each pixel; and reversely mapping the fused brightness information and the mapped chrominance value from the YUV space to the RGB space, to obtain the dehazed image.

6. The method according to claim 1, wherein, before the acquiring the first image and the second image corresponding to the target scene, the method further comprises:

acquiring an initial image of the target scene;
performing haze detection on the initial image, to obtain a detection result;
determining whether the detection result indicates that haze exists in the initial image; and
in response to determining that the detection result indicates that the haze exists in the initial image, generating an image dehazing instruction.

7. An apparatus for performing a dehazing process in an image, the apparatus comprising:
a memory storing instructions; and
a processor in communication with the memory, wherein, when the processor executes the instructions, the processor is configured to cause the apparatus to perform:
acquiring a first image and a second image corresponding to a target scene;
calculating, based on a first pixel value of each pixel of the first image and a second pixel value of each pixel of the second image, haze density information of each pixel, by:
extracting a blue-light brightness value of each pixel from the first pixel value of each pixel of the first image, and using the second pixel value of each pixel of the second image as an infrared brightness value of each pixel; and
calculating the haze density information of each pixel according to a difference between the blue-light brightness value and the infrared brightness value;
generating an image fusion factor of each pixel according to the haze density information, the image fusion factor indicating a fusion degree between the first image and the second image; and
fusing the first image and the second image according to the image fusion factor to obtain a dehazed image.

8. The apparatus according to claim 7, wherein, when the processor is configured to cause the apparatus to perform calculating the haze density information of each pixel according to the difference between the blue-light brightness value and the infrared brightness value, the processor is configured to cause the apparatus to perform:

calculating the difference between the blue-light brightness value and the infrared brightness value, to obtain a difference result of each pixel;

extracting a maximum difference result from the difference result of each pixel as a haze density information calculation factor; and comparing the difference result of each pixel with the haze density information calculation factor, to obtain the haze density information of each pixel.

9. The apparatus according to claim 7, wherein:
when the processor executes the instructions, the processor is configured to further cause the apparatus to perform:
calculating a dark channel value of each pixel according to the first pixel value of each pixel of the first image, comparing the haze density information with the dark channel value, to obtain a comparison result, and
generating optimized haze density information for each pixel according to the comparison result; and when the processor is configured to cause the apparatus to perform generating the image fusion factor of each pixel according to the haze density information, the processor is configured to cause the apparatus to perform:
generating the image fusion factor of each pixel according to the optimized haze density information.

10. The apparatus according to claim 9, wherein, when the processor is configured to cause the apparatus to perform calculating the dark channel value of each pixel according to the first pixel value of each pixel of the first image, the processor is configured to cause the apparatus to perform:
obtaining a blue-light brightness value, a red-light brightness value, and a green-light brightness value respectively from the first pixel value of each pixel of the first image;
selecting a minimum brightness value from the blue-light brightness value, the red-light brightness value, and the green-light brightness value as a candidate brightness value of each pixel;
determining all pixels located in a preset pixel range as neighborhood pixels for each pixel; and
selecting a minimum candidate brightness value from candidate brightness values of the neighborhood pixels as the dark channel value of each pixel.

11. The apparatus according to claim 7, wherein, when the processor is configured to cause the apparatus to perform fusing the first image and the second image according to the image fusion factor to obtain the dehazed image, the processor is configured to cause the apparatus to perform:
mapping the first image from an RGB space to a YUV space, to obtain a mapped brightness value and a mapped chrominance value of each pixel;
calculating a first brightness result of each pixel based on the image fusion factor and the second pixel value of each pixel of the second image, and calculating a second brightness result of each pixel using the image fusion factor and the mapped brightness value;
superposing the first brightness result and the second brightness result, to obtain fused brightness information of each pixel; and
reversely mapping the fused brightness information and the mapped chrominance value from the YUV space to the RGB space, to obtain the dehazed image.

12. The apparatus according to claim 7, wherein, before the processor is configured to cause the apparatus to perform acquiring the first image and the second image corresponding to the target scene, the processor is configured to further cause the apparatus to perform:
acquiring an initial image of the target scene;
performing haze detection on the initial image, to obtain a detection result;
determining whether the detection result indicates that haze exists in the initial image; and
in response to determining that the detection result indicates that the haze exists in the initial image, generating an image dehazing instruction.

13. A non-transitory computer-readable storage medium, storing computer-readable instructions, wherein, the computer-readable instructions, when executed by a processor, are configured to cause the processor to perform:
acquiring a first image and a second image corresponding to a target scene;

calculating, based on a first pixel value of each pixel of the first image and a second pixel value of each pixel of the second image, haze density information of each pixel, by:
extracting a blue-light brightness value of each pixel from the first pixel value of each pixel of the first image, and using the second pixel value of each pixel of the second image as an infrared brightness value of each pixel; and
calculating the haze density information of each pixel according to a difference between the blue-light brightness value and the infrared brightness value;
generating an image fusion factor of each pixel according to the haze density information, the image fusion factor indicating a fusion degree between the first image and the second image; and
fusing the first image and the second image according to the image fusion factor to obtain a dehazed image.

14. The non-transitory computer-readable storage medium according to claim 13, wherein, when the computer-readable instructions are configured to cause the processor to perform calculating the haze density information of each pixel according to the difference between the blue-light brightness value and the infrared brightness value, the computer-readable instructions are configured to cause the processor to perform:
calculating the difference between the blue-light brightness value and the infrared brightness value, to obtain a difference result of each pixel;
extracting a maximum difference result from the difference result of each pixel as a haze density information calculation factor; and
comparing the difference result of each pixel with the haze density information calculation factor, to obtain the haze density information of each pixel.

15. The non-transitory computer-readable storage medium according to claim 13, wherein:
the computer-readable instructions, when executed by the processor, are configured to further cause the processor to perform:
calculating a dark channel value of each pixel according to the first pixel value of each pixel of the first image,
comparing the haze density information with the dark channel value, to obtain a comparison result, and
generating optimized haze density information for each pixel according to the comparison result; and
when the computer-readable instructions are configured to cause the processor to perform generating the image fusion factor of each pixel according to the haze density information, the computer-readable instructions are configured to cause the processor to perform:
generating the image fusion factor of each pixel according to the optimized haze density information.

16. The non-transitory computer-readable storage medium according to claim 15, wherein, when the computer-readable instructions are configured to cause the processor to perform calculating the dark channel value of each pixel according to the first pixel value of each pixel of the first image, the computer-readable instructions are configured to cause the processor to perform:
obtaining a blue-light brightness value, a red-light brightness value, and a green-light brightness value respectively from the first pixel value of each pixel of the first image;

selecting a minimum brightness value from the blue-light brightness value, the red-light brightness value, and the green-light brightness value as a candidate brightness value of each pixel;

determining all pixels located in a preset pixel range as neighborhood pixels for each pixel; and selecting a minimum candidate brightness value from candidate brightness values of the neighborhood pixels as the dark channel value of each pixel.

17. The non-transitory computer-readable storage medium according to claim 13, wherein, when the computer-readable instructions are configured to cause the processor to perform fusing the first image and the second image according to the image fusion factor to obtain the dehazed image, the computer-readable instructions are configured to cause the processor to perform:

mapping the first image from an RGB space to a YUV space, to obtain a mapped brightness value and a mapped chrominance value of each pixel;

calculating a first brightness result of each pixel based on the image fusion factor and the second pixel value of each pixel of the second image, and calculating a second brightness result of each pixel using the image fusion factor and the mapped brightness value;

superposing the first brightness result and the second brightness result, to obtain fused brightness information of each pixel; and reversely mapping the fused brightness information and the mapped chrominance value from the YUV space to the RGB space, to obtain the dehazed image.

* * * * *